(12) United States Patent
Deguchi et al.

(10) Patent No.: US 7,830,639 B2
(45) Date of Patent: Nov. 9, 2010

(54) DATA STORAGE DEVICE AND DISK DRIVE

(75) Inventors: Takaaki Deguchi, Kanagawa (JP); Mutsuro Ohta, Kanagawa (JP); Hiroshi Matsuda, Kanagawa (JP); Katsuhiko Ohta, Tokyo (JP); Shinichi Kimura, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 918 days.

(21) Appl. No.: 11/708,092

(22) Filed: Feb. 16, 2007

(65) Prior Publication Data

US 2007/0206330 A1   Sep. 6, 2007

(30) Foreign Application Priority Data

Mar. 6, 2006   (JP) .............................. 2006-059523

(51) Int. Cl.
*G11B 5/54* (2006.01)
(52) U.S. Cl. .................................................. 360/254.8
(58) Field of Classification Search ............. 360/254.8, 360/255, 244.2, 254.7, 245.7, 245.3; 720/676
See application file for complete search history.

(56) References Cited

U.S. PATENT DOCUMENTS

| | | | | |
|---|---|---|---|---|
| 5,446,611 | A * | 8/1995 | Webber | 360/245 |
| 6,151,197 | A * | 11/2000 | Larson et al. | 360/255 |
| 6,307,716 | B1 | 10/2001 | Hamaguchi et al. | |
| 6,867,939 | B2 * | 3/2005 | Katahara et al. | 360/53 |
| 7,301,730 | B2 * | 11/2007 | Lee et al. | 360/255 |
| 7,365,945 | B2 * | 4/2008 | Fujimoto et al. | 360/255 |
| 7,450,347 | B2 * | 11/2008 | Suzuki et al. | 360/255 |
| 7,609,483 | B2 * | 10/2009 | Deguchi et al. | 360/254.7 |
| 2003/0193762 | A1 * | 10/2003 | Hayashi et al. | 360/324.12 |
| 2005/0030671 | A1 * | 2/2005 | Lee et al. | 360/255 |
| 2005/0047021 | A1 | 3/2005 | Kim et al. | |
| 2005/0174694 | A1 * | 8/2005 | Erpelding | 360/244.8 |

FOREIGN PATENT DOCUMENTS

| | | |
|---|---|---|
| JP | 08-221922 | 8/1996 |
| JP | 11-250603 | 9/1999 |
| JP | 2005-011511 | 1/2005 |
| JP | 2005-071588 | 3/2005 |

* cited by examiner

*Primary Examiner*—Allen T Cao
(74) *Attorney, Agent, or Firm*—Townsend and Townsend; John Henkhaus

(57) ABSTRACT

Embodiments in accordance with the present invention provide achieve an increase of storage capacity and thinning down of a disk drive by reducing effects from an error in an assembly position of a ramp. A data storage device according to an embodiment of the present invention includes a head, a ramp, a load beam, and an actuator. The ramp includes a portion onto which the head is retracted from a surface of a medium. The load beam includes a head support portion that supports the head and a tab disposed more on the side of a leading end than the head support portion. The tab has a leading end that slides over, while being in contact with, a sliding surface of the ramp. The actuator includes the load beam and loads and unloads the head.

14 Claims, 10 Drawing Sheets

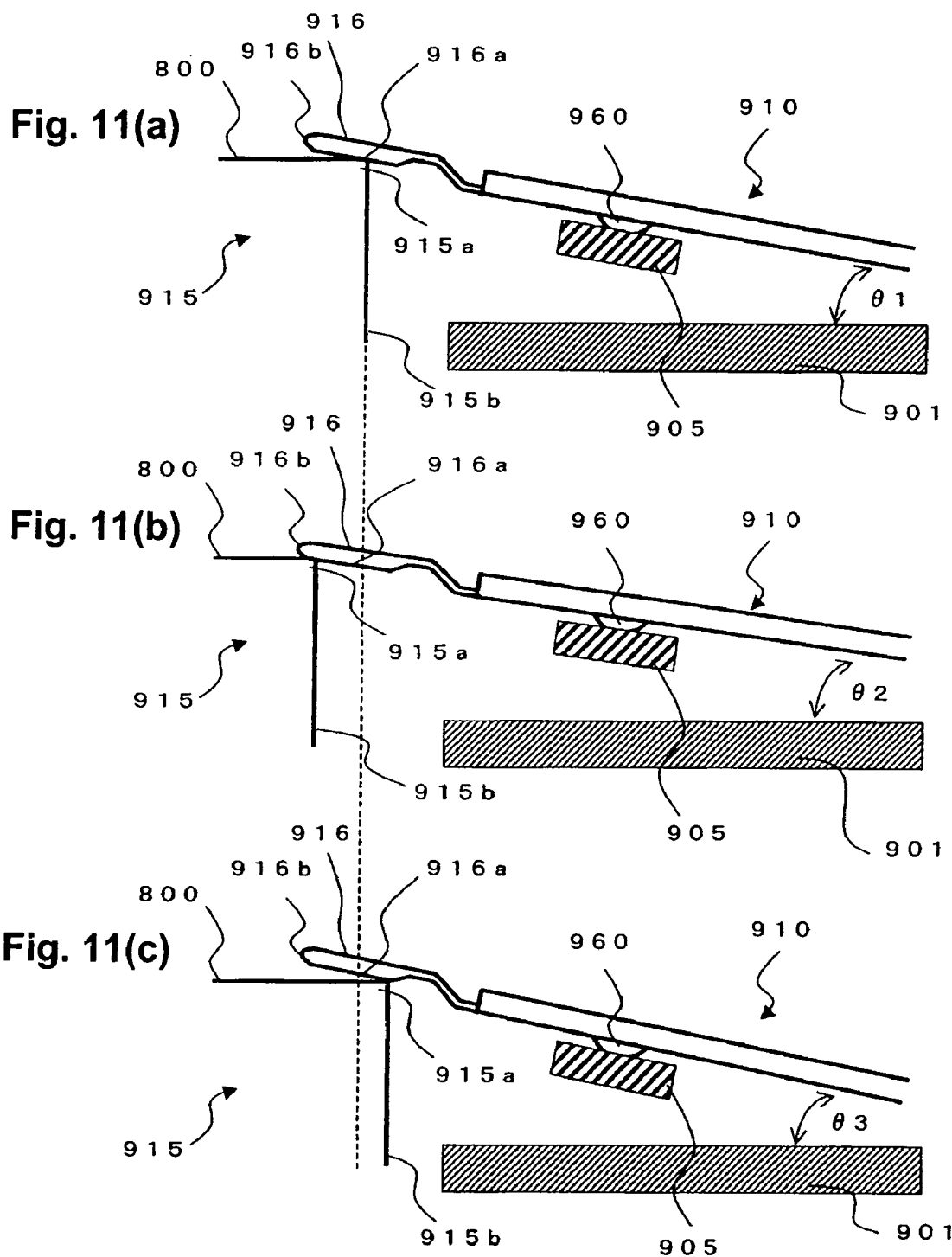

DATA STORAGE DEVICE AND DISK DRIVE

CROSS-REFERENCES TO RELATED APPLICATIONS

The instant nonprovisional patent application claims priority to Japanese Patent Application 2006-059523, filed Mar. 6, 2006 and is incorporated by reference herein for all purposes.

BACKGROUND OF THE INVENTION

Embodiments in accordance with the present invention relate to data storage devices and disk drives and, more particularly, to a load/unload mechanism thereof.

The devices using an optical disk, a magnetic tape, or other forms of media are known as data storage devices. Among them, a hard disk drive (HDD) is commonly used as a storage device for a computer, and the HDD is one of storage devices essential for computer systems which are currently used. In addition, the use of the HDD are not only limited to computer systems but also has widely expanded because of the superior characteristics. The HDDs are used, for example, for moving picture recording/reproducing devices, car navigation systems, cellular phones, removable memories used for digital cameras and the like.

The HDD includes a magnetic disk in which data is recorded, and a head that writes data to and/or reads data from the magnetic disk. The head includes a head element and a slider. The head element is a thin film element. The slider has the head element disposed on a surface thereof. Further, the head element includes a write element portion and a read element portion. The write element portion converts an electric signal to a magnetic field according to data to be recorded in the magnetic disk. The read element portion converts a magnetic field from the magnetic disk to an electric signal.

The HDD further includes an actuator that moves the head to any desired position on the magnetic disk. The actuator driven by a voice coil motor (VCM) pivots with a rotating shaft used as an central axis of the pivot movement, thus actuating the head to move above a rotating magnetic disk in a radial direction of the magnetic disk. The movement of the head slider allows the head (head element) to access a desired track formed on the magnetic disk to perform data read/write operations.

In addition, a load/unload type HDD includes a ramp that has a retracted position onto which the head is retracted from the surface of the magnetic disk. The ramp is disposed in proximity to an outer peripheral end portion of the magnetic disk. As the rotation of the magnetic disk stops, the head is attracted to the surface of the magnetic disk. Accordingly, when the rotation of the magnetic disk stops, the actuator retracts the head from a recording surface of the magnetic disk to the ramp.

The actuator includes a suspension for supporting the head and an arm. The suspension includes a tab disposed at a leading end thereof. As the tab is guided into the ramp, the head is retracted to the outside of the magnetic disk from a position above the surface of the magnetic disk to be unloaded. As the tab leaves the ramp, on the other hand, the head is moved inward to the point above the surface of the magnetic disk from the outside of the magnetic disk to be loaded.

FIG. 9 is a side elevational view showing a load beam 910 disposed at a leading end portion of a suspension used in a conventional HDD. FIG. 9 shows a state of the load beam 910 when a head 905 is located above a magnetic disk 901.

Referring to FIG. 9, the head 905 is supported at a single point by a dimple 960 disposed on the load beam 910. The head 905 thereby flies at a predetermined height above the surface of the magnetic disk 901. A tab 916 extends from a leading end portion of the load beam 910 and is bent in the direction away from the magnetic disk 901. Specifically, the tab 916 is formed to be higher than a head support portion 961 of the load beam 910 above the magnetic disk 901. Especially, the tab 916 extends in the direction identical to the direction in which the load beam 910 (the head support portion 961) extends. Specifically, in the state where the head 905 flies above the magnetic disk 901, the load beam 910 (the head support portion 961) is inclined at substantially the same angle as the one at which the tab 916 is inclined relative to the surface of the magnetic disk 901.

FIG. 10 is a view showing the state during loading or unloading as viewed from the side of a leading end of the conventional load beam 910. FIGS. 11(a) to 11(c) are views showing the states during loading or unloading as viewed from the side of the conventional load beam 910.

Referring to FIG. 10, sliding the tab 916 along a sliding surface 800 that is a front surface of a ramp 915 during unloading makes it possible to lift the load beam 910 up to a predetermined height, thereby to cause the head 905 to moves away from the magnetic disk 901. During the time, the tab 916 first slides along, while being in contact with, a magnetic disk side inclined surface 801 of the sliding surface 800 to be eventually lifted up to a maximum lift surface 802. In FIG. 10, reference numeral 901a represents a position of the tab 916 to make the first contact with the magnetic disk side inclined surface 801. Reference numeral 901b represents a position of the tab 916 to be lifted up to a height required to position the head 905 away from the magnetic disk 901. Further, a height H represents a distance required to position the head 905 away from the magnetic disk 901.

Referring to FIG. 11(a), during loading or unloading, a corner 915a that is the sliding surface of the ramp 915 on the side of the tab 916 contacts part of an abdominal surface 916a of the tab 916, and a leading end portion 916a of the tab 916 is away from the sliding surface 800 of the ramp 915. The position and size of the ramp 915 vary according to mechanical errors. Herein, only errors in a ramp assembly position (in the direction toward a rotary shaft of the suspension) are considered without considering errors in the height direction of the ramp. For example, the errors in the ramp assembly position include an actuator assembly error and a ramp assembly error.

FIG. 11(a) is a view showing the state where there is no error in the assembly position of the ramp 915. FIG. 11(b) is a view showing the state where a side surface 915b of the ramp 915 on the side of the load beam 910 is far away from the load beam 910. FIG. 11(c) is a view showing the state where the side surface 915b of the ramp 915 on the side of the load beam 910 is close to the load beam 910.

In the state shown in FIG. 11(a), the corner 915a of the ramp 915 is in contact with a point near the center of the abdominal surface 916a of the tab 916. In the state shown in FIG. 11(b), since the side surface 915b of the ramp 915 is far away from the load beam 910, the corner 915a of the ramp 915 is in contact with a leading end side of the abdominal surface 916a of the tab 916. In the state shown in FIG. 11(c), since the side surface 915b of the ramp 915 is close to the load beam 910, the corner 915a of the ramp 915 is in contact with the root side of the abdominal surface 916a of the tab 916. Specifically, the corner 915a represents a point of contact between the ramp 915 and the tab 916, and the point of contact between the ramp 915 and the tab 916 varies due to the error in the assembly position of the ramp 915. Accordingly, the error in the assembly position of the ramp 915 should be taken into consideration and the tab 916 should be adapted to have a length long enough to reach the ramp 915 even when the ramp 915 is disposed to be farthest away from the load beam 910.

Further, considering an inclination of the load beam 910 relative to the magnetic disk 901 when the load beam 910 is lifted up, it is assumed that the inclination of the load beam 910 in the state shown in FIG. 11(a) is q1, the inclination of the load beam 910 in the state shown in FIG. 11(b) is q2, and the inclination of the load beam 910 in the state shown in FIG. 11(c) is q3. Then, since the position at which the tab 916 is contact with the ramp 915, that is, the position at which the tab 916 is lifted up are different from each other, the relationship of q2<q1<q3 are established.

If the inclination of the load beam 910 during loading or unloading varies due to the error in the assembly position of the ramp 915, the position (901b shown in FIG. 10) at which the head 905 is moved away from the magnetic disk 901 during unloading varies. For example, if the inclination of the load beam 910 is small because of the corner 915a of the ramp 915 being disposed far away from the load beam 910 as shown in FIG. 11 (b), the position at which the head 905 is moved away from the magnetic disk 901 during unloading is far away from the center of the magnetic disk 901. If the inclination of the load beam 910 is large because of the corner 915a of the ramp 915 being disposed close to the load beam 910 as shown in FIG. 11(c), the position at which the head 905 is moved away from the magnetic disk 901 during unloading is close to the center of the magnetic disk 901.

The position 901b, at which the head 905 is moved away from the magnetic disk 901, determines the range of a recording area on the magnetic disk 901. If the position 901b is changed by the error in the assembly position of the ramp 915, the recording area on the magnetic disk 901 also changes. It is therefore necessary to take into consideration the error in the assembly position of the ramp and thereby define, as an effective recording area, a narrow range of recording area in the state where the ramp is disposed the closest to the load beam. The ramp is required to be high enough to secure a disk recording area while the load beam is lifted up to a required height regardless of the error in the assembly position of the ramp. If the ramp is high, however, it imposes restrictions on the thickness of the magnetic disk drive.

Further, the error in the assembly position of the ramp varies the length from the point of contact between the tab and the ramp to the leading end of the tab. As a result, the height up to the leading end of the tab is not constant when the tab is in contact with the ramp. Consequently, the restrictions are imposed on the thickness of the magnetic disk drive, since it is also necessary to consider the case where of the root side of the tab can be in contact with the ramp, as shown in FIG. 11(c).

Patent Document 1 (Japanese Patent Laid-open No. 2005-71588) discloses an arrangement in which a tab includes a protrusion that is disposed at a leading end thereof and in contact with a ramp in order to reduce an area of contact between the tab and the ramp. The protrusion is not, however, intended to expand the storage capacity of the magnetic disk or make the magnetic disk drive thinner. In addition, the tab as disclosed in Patent Document 1 is extended in a flat sheet shape from the leading end of the load beam. As a result, the tab tends to flexible when the protrusion of the tab contacts the ramp, posing a problem of inferior rigidity of the tab.

Further, referring to FIG. 10, the conventional tab 916 has a width narrower than the head support portion 961 of the load beam 910. The tab 916 is extended from the center of the leading end of the load beam 910, having a U-shaped cross section in a crosswise direction (the same applies to the arrangement disclosed in Patent Document 2 (Japanese Patent Laid-open No. 2005-11511). Accordingly, during unloading, the magnetic disk side inclined surface 801 of the ramp 915 contacts the center of the tab 916, that is, the center of the load beam 910.

Depending on the position and shape of the ramp, for example, there may be cases where the head 905 is preferably positioned closer to the center of the magnetic disk when the tab 916 makes the first contact with the ramp 915 during unloading, or where the point of contact 901a between the tab 916 and the ramp 915 is preferably positioned at a point closer to the outside of the magnetic disk. In these cases, the conventional arrangement has the tab 916 disposed asymmetrically relative to the center of the load beam 910 in the crosswise direction. According to the arrangement disclosed in Patent Document 3 (Japanese Patent Laid-open No. Hei 11-250603), the portion of contact between the tab and the ramp is inclined relative to a central axis of the suspension. The tab formed asymmetrically or the portion of contact between the tab and the ramp being inclined leads to severe vibration during loading or unloading because of a torsional stress involved, or dynamic characteristics of the suspension including the load beam could be substantially aggravated.

It is to be noted that, in the arrangement disclosed in Patent Document 4 (Japanese Patent Laid-open No. Hei 8-221922), the suspension has a symmetrical leading end and includes a flange portion formed at part of an outer periphery of the leading end thereof. This flange portion is made to be in contact with the ramp (a lift portion). Since the flange is disposed only at a position of the suspension in contact with the ramp in this case, vibration caused by a torsional stress cannot be prevented during loading or unloading.

As described heretofore, the conventional HDD includes the tab that is extended in the same direction as the head support portion of the load beam and the abdominal surface of the tab contacts the corner of the ramp during loading or unloading. Accordingly, the length of the tab and the recording area of the magnetic disk are subject to restrictions imposed by the error in the assembly position of the ramp. There is therefore the problem in that it is difficult to increase the storage capacity of the magnetic disk and make the magnetic disk drive thinner.

Further, the conventional HDD has the arrangements in which the tab is disposed asymmetrically, the portion of the tab in contact with the ramp is inclined, or the tab includes the flange formed at only the portion in contact with the ramp, when the point of the first contact between the tab and the ramp during unloading is positioned closer to the outside of the disk. This poses the problem of decreasing rigidity of the tab and dynamic characteristics of the suspension.

BRIEF SUMMARY OF THE INVENTION

Embodiments in accordance with the present invention provide an increase of storage capacity and reduce effects from an error in an assembly position of a ramp. Referring to the specific embodiment shown in FIG. 3, a data storage device according to an embodiment of the present invention includes a head 105, a ramp 115, a load beam 302, and an actuator 106. The ramp 115 includes a portion onto which the head 105 is retracted from a surface of a medium. The load beam 302 includes a head support portion 302a that supports the head 105 and a tab 116 disposed more on the side of a leading end than the head support portion 302a. The tab 116 has a leading end that slides over, while being in contact with, a sliding surface of the ramp 115. The actuator 106 includes the load beam 302 and loads and unloads the head 105.

For a more complete understanding of the present invention, reference is made to the following detailed description taken in conjunction with the accompanying drawings.

BRIEF DESCRIPTION OF THE DRAWINGS

FIGS. 11(a) to 11(c) are exemplary views showing a state of a conventional tab and a conventional head during loading or unloading.

DETAILED DESCRIPTION OF THE INVENTION

Figure 1:
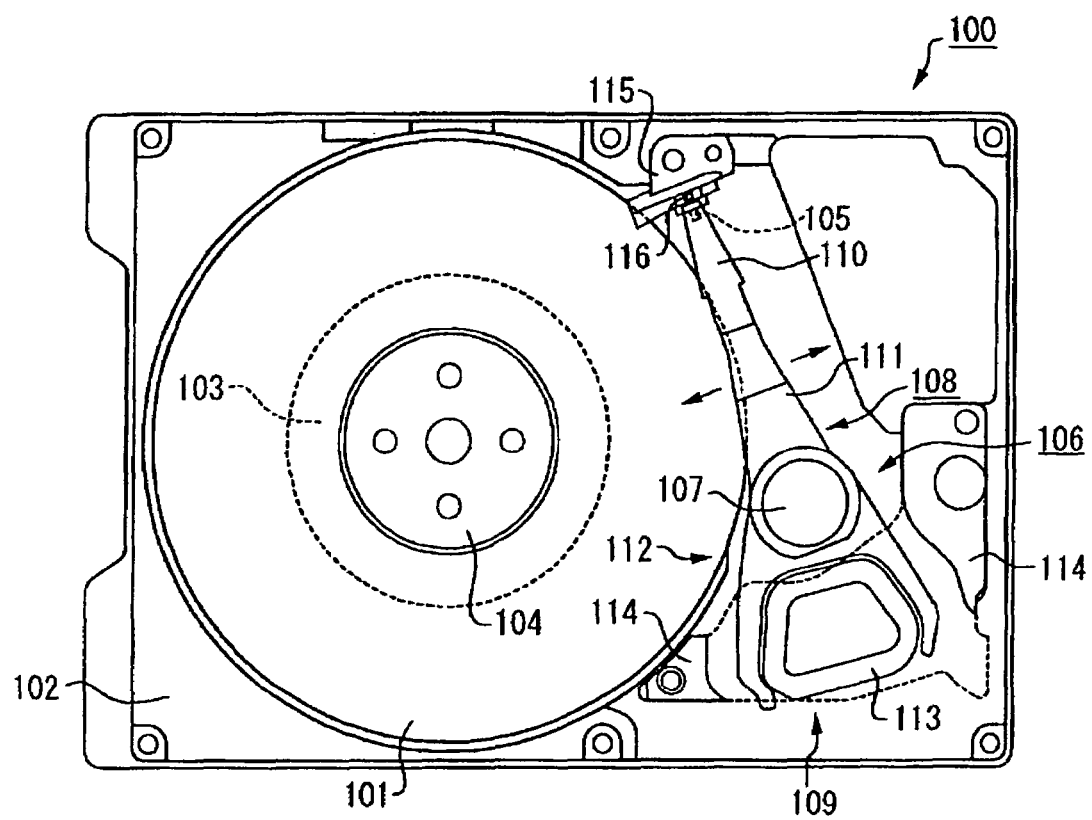
FIG. 1 is an exemplary view showing schematically an arrangement of a hard disk drive according to an embodiment of the present invention.

Embodiments in accordance with the present invention reduce the effects from the error in the assembly position of the ramp on the length of the tab and the recording area of the disk, and increase the storage capacity and thin the disk drive. Embodiments of the present invention also suppresses degradation of rigidity and dynamic characteristics of the tab even when the point of the first contact of the tab with the ramp during unloading is positioned closer to the outside of the disk.

A data storage device according to an embodiment of the present invention includes a head, a ramp, and an actuator. The head accesses the recording area of a medium. The ramp has a retracted position onto which the head is unloaded from a surface of the medium. The actuator pivots around a pivot axis to unload the head onto the retracted position and load the head from the retracted position onto the surface of the medium. The actuator has a load beam that includes a head support portion that supports the head and a tab disposed on the side opposite to the pivot axis relative to the head support portion. The tab includes a leading end that is in contact with the ramp. According to this data storage device, effects from an error in an assembly position of the ramp may be reduced in terms of the length of the tab and the recording area of the disk. This makes it possible to increase storage capacity and thin a disk drive.

In the data storage device according to an embodiment of the present invention, portions of the tab excluding the leading end may be away from the ramp when the tab is in contact with the ramp. As a result, the effects from the error in the assembly position of the ramp may be reliably reduced.

In the data storage device according to an embodiment of the present invention, the tab may extend more toward the medium side than the head support portion when the tab is located at a position above the surface of the medium. As a result, the effects from the error in the assembly position of the ramp may be effectively reduced.

In the data storage device according to an embodiment of the present invention, when the tab is in contact with the ramp, a height from the surface of the medium to a point of contact between the tab and the ramp may be lower than a height from the surface of the medium to a portion of the head support portion farthest from the surface of the medium. As a result, the effects from the error in the assembly position of the ramp may be even further reduced.

In the data storage device according to an embodiment of the present invention, the center of the tab in the direction of the pivotal motion may coincide with the center of the end of the head support portion on the side adjacent to the tab, and the leading end away from the center of the tab in the direction of the pivotal motion may contact the inclined surface of the ramp. As a result, the first point of contact between the tab and the ramp during unloading may be closer to the outside of the recording medium.

In the data storage device according to an embodiment of the present invention, a portion of the tab near the head support portion may have a width identical to that of the head support portion. Further, the leading end of the tab may have a width narrower than that of the portion of the tab near the head support portion. As a result, the first point of contact between the tab and the ramp during unloading may be even closer to the outside of the recording medium. This results in saving the weight of and improving of impact resistance of the tab.

In the data storage device according to an embodiment of the present invention, both ends of the tab in the direction of the pivotal motion may be extended from both ends of the head support portion on the side adjacent to the tab. As a result, the first point of contact between the tab and the ramp during unloading may be closer to the outside of the recording medium.

In the data storage device according to an embodiment of the present invention, the tab may include a flange formed by bending a leading end portion thereof. As a result, rigidity of the tab may be improved and degradation of the dynamic characteristics during loading or unloading may be suppressed.

In the data storage device according to an embodiment of the present invention, the load beam may include a flange formed by bending both end edges thereof in the direction of the pivotal motion. As a result, rigidity of the load beam may be improved and degradation of the dynamic characteristics during loading or unloading may be suppressed.

In the data storage device according to an embodiment of the present invention, the flanges may be formed continuously from the leading end of the tab up to the both ends of the head support portion in the direction of the pivotal motion. As a result, the rigidity of the load beam may be effectively improved and degradation of dynamic characteristics during loading or unloading may be suppressed.

A disk drive according to another embodiment of the present invention includes a head, a ramp, and an actuator. The head accesses a recording area of a disk. The ramp includes a retracted position onto which the head is unloaded from the surface of the disk. The actuator pivots around a pivot axis to unload the head onto the retracted position and load the head from the retracted position onto the surface of the disk. The actuator has a gimbal and a load beam. The gimbal supports the head on the surface side of the disk. The load beam includes a gimbal support portion and a tab. The gimbal support portion supports the gimbal on the surface of the disk. The tab is disposed on the side opposite to the pivot axis relative to the gimbal support portion. The tab slides over the ramp. When the tab is located on the highest surface of the ramp during the unloading operation, the surface of the gimbal on the side of the disk intersects with the surface of the ramp. This arrangement allows the tab to be bent and enhance rigidity of the tab. Further, the leading end of the tab may contact with the surface of the ramp. As a result, the disk drive may be made thinner regardless of the intersection of the ramp with gimbal.

According to embodiments of the present invention, the effects from the error in the assembly position of the ramp may be reduced in terms of the length of the tab and the recording area of the medium. Increasing the storage capacity and thinning the data storage device may thereby be achieved. In addition, according to embodiments of the present invention, the degradation of the rigidity and dynamic characteristics of the tab may be suppressed even when the first point of contact between the tab and the ramp during unloading is closer to the outside of the medium.

Specific embodiments to which the present invention is applied will be described below. It should be understood that the description given hereunder is made of the embodiments of the present invention and the present invention is not limited to the following embodiments. For the sake of clarity, specific details may be omitted or simplified as appropriate in the descriptions and drawings given hereunder. It will of course be apparent to those skilled in the art that elements embodied in the embodiments described hereunder may be changed, added, or replaced easily within the scope of the present invention. In each of the accompanying drawings, like reference numerals refer to like parts and duplicate descriptions are omitted as may be applicable for clarity purposes.

FIG. 1 is a view showing schematically the arrangement of a hard disk drive (HDD) 100 according to an embodiment of the present invention. FIG. 1 shows the HDD 100 disposed during operation of an actuator. A magnetic disk 101, which is an example of media, is a nonvolatile recording disk in which a magnetic layer is magnetized to record data. A base 102 is fixed via a gasket (not shown) to a cover (not shown) that closes an upper opening of the base 102 to form a disk enclosure. Elements of the HDD 100 may thereby be accommodated in a hermetically sealed condition.

A clamp 104 secures the magnetic disk 101 to a spindle motor 103. The magnetic disk 101 is rotatably driven at a predetermined angular velocity (speed) by the spindle motor 103 that is secured to a bottom surface of the base 102. If the HDD 100 is not in an operating state, the magnetic disk 101 remains stationary. A head 105 accesses a recording area of the magnetic disk 101. The head 105 includes a head element and a slider to which the head element is secured. The head element has a write head portion and a read head portion that are formed integrally with each other. The write head portion converts an electric signal to a magnetic field according to data to be recorded in the magnetic disk 101. The read head portion converts a magnetic field from the magnetic disk 101 to an electric signal. The write head portion may be formed separately from the read head portion. It is also possible to apply the present invention to an HDD having either the write head portion or the read head portion only.

An actuator 106 holds and moves the head 105. Referring to FIG. 1, the actuator 106 is pivotally held by a pivot 107. The actuator 106 includes a carriage 108 and a VCM (voice coil motor) 109 as a drive mechanism. The carriage 108 includes a suspension 110, an arm 111, and a coil support 112. Each of the suspension 110, the arm 111, and the coil support 112, is connected to each other, disposed in that order from a leading end portion of the carriage 108, at which the head 105 is disposed.

The arrangement of the suspension 110 will be described in detail later. From a viewpoint of dynamic characteristics, it is preferable that the mass of the suspension 110 be symmetrical about a line connecting a center of the pivot 107 and a slider of the head 105. Further, from a viewpoint of reducing vibration of the torsional mode, it is preferable that the arm 111 have an outline that is symmetrical about a line connecting the center of the pivot of the arm 111 and the slider of the head 105.

The coil support 112 holds a flat coil 113. An upper stator magnet holding plate 114 is secured to the base 102 and clamps the flat coil 113 with a lower stator magnet holding plate (not shown).

A ramp 115 has a retracted position onto which the head 105 is unloaded from a surface of the magnetic disk 101 when the magnetic disk 101 stops. The suspension 110 includes a tab 116 formed at a leading end portion thereof. The ramp 115 is disposed in proximity to an outer peripheral end portion of the magnetic disk 101. The ramp 115 is fitted to a bottom surface or a side surface of the base 102 by a column disposed at a position outside the orbit of the tab 116.

The VCM 109 causes the carriage 108 to pivot about the pivot axis 107 according to a drive signal passing through the flat coil 113 from a controller (not shown). Thus, the head 105 moves onto a recording surface of the magnetic disk 101 or onto the ramp 115 from the recording surface of the magnetic disk 101.

To read data from or write data to the magnetic disk 101, the actuator 106 moves the head 105 to a point above a data area on the surface of a spinning magnetic disk 101. As the actuator 106 pivots, the head 105 moves in the radial direction of the recording surface of the magnetic disk 101. This allows the head 105 to access a desired track. A force generated on an ABS (air bearing surface) of the slider opposing the magnetic disk 101 is balanced with a pressing force exerted by the suspension 110. Accordingly, the head 105 may fly above the magnetic disk 101 with a predetermined gap.

When the magnetic disk 101 stops, the head 105 contacts with and sticks to the surface of the magnetic disk 101. If the head 105 contacts with the surface of the magnetic disk 101 or becomes unstuck therefrom, the data area may be scratched or the stiction disables the rotation of the magnetic disk 101. To avoid these problems, the actuator 106 unloads the head 105 from the data area onto a sliding surface of the ramp 115. Specifically, the actuator 106 pivots toward the ramp 115 and the tab 116 moves sliding along the sliding surface of the ramp 115, so that the tab 116 is eventually rested on a parking surface (stop surface) on the ramp 115. During loading, the actuator 106, which has been supported on the parking surface, leaves the ramp 115 to move above the surface of the magnetic disk 101.

Figure 2:
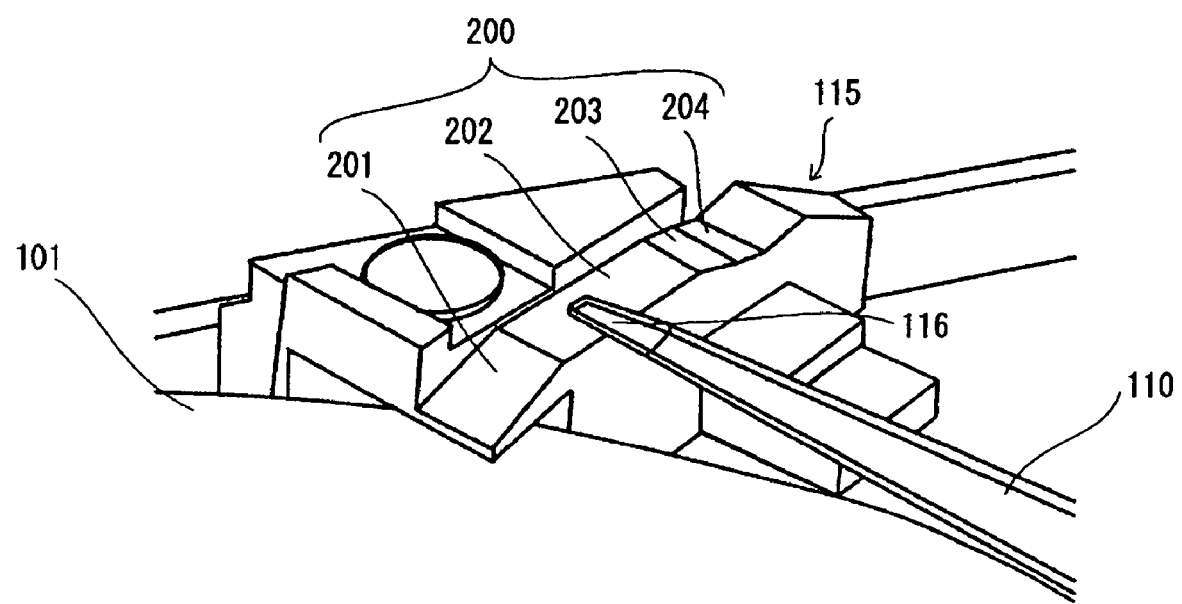
FIG. 2 is an exemplary perspective view showing a state of a ramp and a tab during loading or unloading according to an embodiment of the present invention.

FIG. 2 is a perspective view showing the suspension 110 and the tab 116 disposed at the leading end portion of the suspension 110 during loading or unloading. The ramp 115 includes a sliding surface 200. The sliding surface 200 includes a plurality of faces that are continuously connected with each other. Specifically, the sliding surface 200 includes a magnetic disk side inclined face 201, a maximum lift surface 202, a parking side inclined surface 203, and a parking surface 204. More specifically, the magnetic disk side inclined face 201 has a height that gradually increases from an end portion on the side of the magnetic disk 101 toward the maximum lift surface 202. The maximum lift surface 202 lifts the tab 116 to the highest level. The maximum lift surface 202 extends in parallel with the surface of the magnetic disk 101. The parking side inclined surface 203 has a height that gradually decreases from the maximum lift surface 202 toward the parking surface 204. The parking surface 204, which is lower in height than the maximum lift surface 202, supports (locks) the tab 116 on a stop position (home position).

When the head 105 is unloaded from the data area, the actuator 106 pivots in the direction of the ramp 115 and the tab 116 slides over the sliding surface 200 as described above. Specifically, the tab 116 contacts with the magnetic disk side inclined face 201 of the sliding surface 200 and then ascends along the magnetic disk side inclined face 201. After the ascent is completed and the tab 116 slides over the maximum lift surface 202, it descends along the parking side inclined surface 203. After the descent is completed, the tab 116 comes to a stop on the parking surface 204. Accordingly, the tab 116 is in contact with the parking surface 204 when the actuator 106 is unloaded at the retracted position. A loading sequence reverses the unloading sequence. Specifically, the tab 116 slides along the parking surface 204, the parking side inclined surface 203, the maximum lift surface 202, and the magnetic disk side inclined face 201, in that order. The tab 116 thereby leaves the sliding surface 200 to move above the magnetic disk 101.

For simplicity, the foregoing description is based on the HDD capable of double-sided recording and including a single magnetic disk 101. For double-sided recording of a plurality of magnetic disks, the plurality of magnetic disks are held integrally in the direction of a rotary shaft of the spindle motor with a predetermined spacing between each of the plurality of magnetic disks. Such an HDD further includes suspensions for holding heads scanning recording surfaces. The number of these suspensions corresponds to the number of the recording surfaces. Further, the suspensions are secured to the coil support 112 via arms at a position overlapping the suspension 110 shown in FIG. 1 with a predetermined spacing between each of the suspensions. The present invention is also applicable to an HDD including a magnetic disk of single-sided recording. In the HDD having the single-sided recording magnetic disk, there is no need to take into consideration a tab on the lower side of the suspension. This allows a bottom surface of the ramp 115 to have a large area, thereby reliably securing the ramp 115 to the surface of the base 102.

Figure 3A:
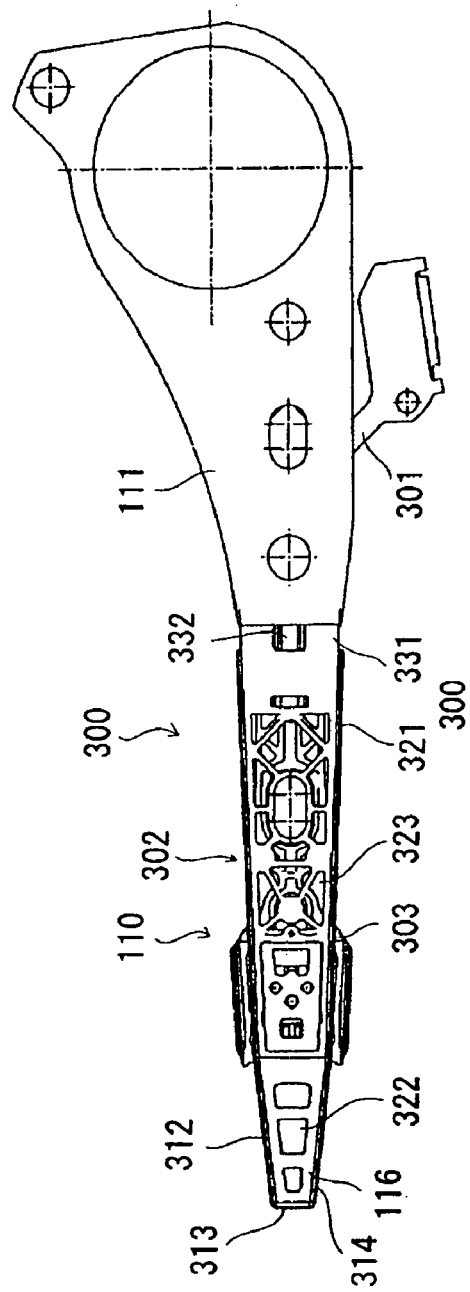
FIGS. 3(a) to 3(c) are exemplary views showing an arrangement of a head suspension assembly and an arm according to an embodiment of the present invention.
Figure 3B:
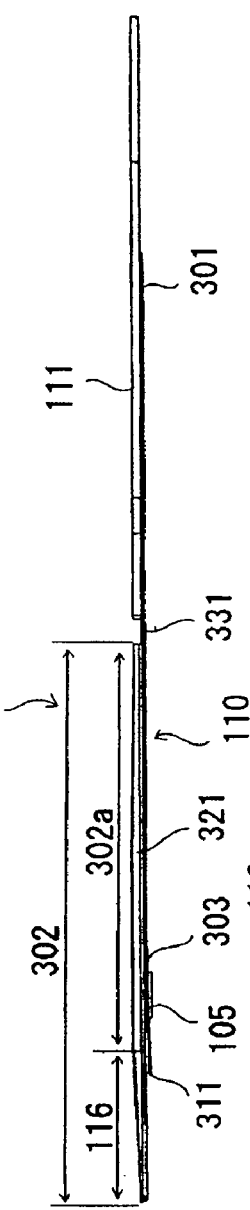
Figure 3C:
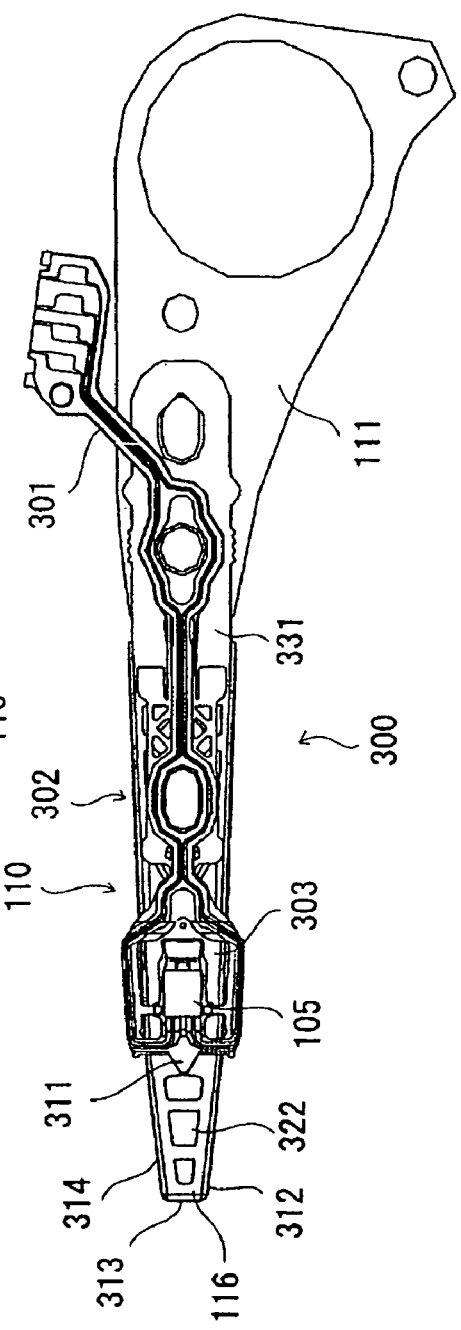
Figures 4A, 4B:
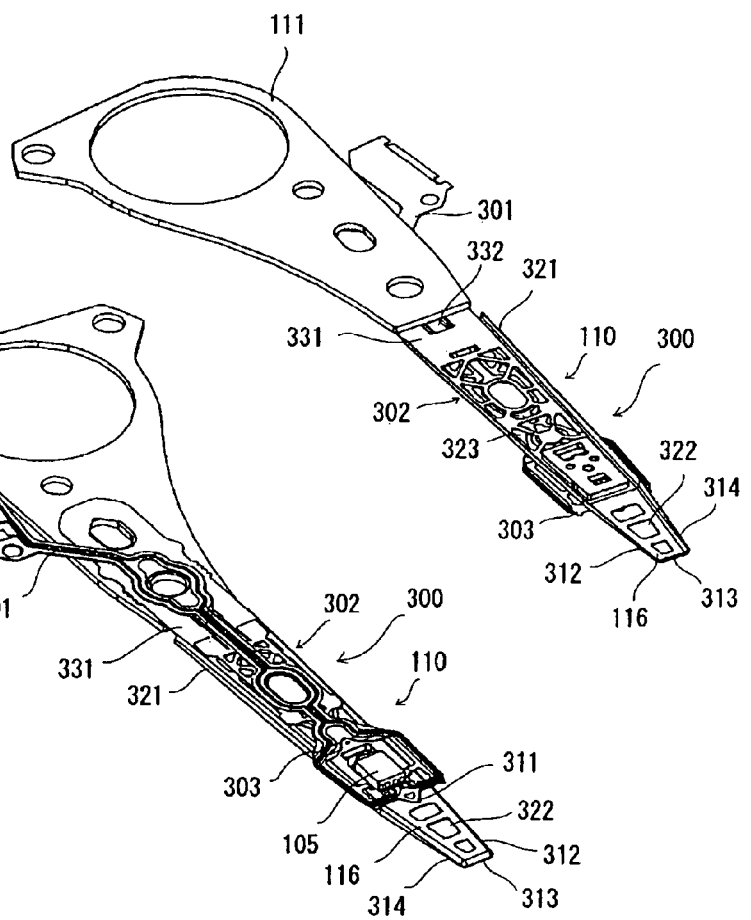
FIGS. 4(a) and 4(b) are exemplary perspective views showing the head suspension assembly and the arm according to an embodiment of the present invention.

Arrangements of the suspension 110 according to an embodiment of the present invention will be described in detail below. FIGS. 3(a) to 3(c) are plan and side views showing schematically an arrangement of a head suspension assembly 300 and the arm 111 used in the HDD 100 according to the embodiment of the present invention. FIGS. 4(a) and 4(b) are perspective views of the head suspension assembly 300 and the arm 111. More specifically, FIGS. 3(a) and 4(a) are views showing the arrangement of the head suspension assembly 300 and the arm 111 as viewed from a backside opposite to the magnetic disk 101. FIGS. 3(c) and 4(b) are views showing the arrangement of the head suspension assembly 300 and the arm 111 as viewed from the side of the magnetic disk 101. FIG. 3(b) is a view showing the arrangement of a side surface of the head suspension assembly 300 and the arm 111.

In accordance with an embodiment of the present invention, the head suspension assembly 300 has a plurality of component members including the head 105, an FPC (flexible printed circuit) 301, and the suspension 110. In accordance with an embodiment of the present invention, the suspension 110 has a plurality of component members including a load beam 302 and a gimbal 303. The arm 111 and the suspension 110 have an opening at the joint portion thereof. The load beam 302 is joined through caulking to the arm 111 on a surface of the arm 111 opposing the magnetic disk 101.

The FPC 301 includes a plurality of leads, each being connected to a connection pad formed on a slider element portion of the head 105. The FPC 301 is secured to the gimbal 303 using an adhesive. The FPC 301 may nonetheless be formed integrally with the gimbal 303.

The gimbal 303 is welded to the load beam 302 through laser spot welding. The gimbal 303 is welded to a front portion of the load beam 302. In referring to different parts of the suspension 110, "front" refers to a leading end side (the side of the tab 116) of the suspension 110 and "rear" refers to a root side (the side of the pivot axis 107) of the suspension 110. The gimbal 303 includes a gimbal tab 311 formed at a front portion thereof. The gimbal tab 311 contacts the ramp 115 when an external impact is received while the head 105 is retracted in the ramp 115, thereby preventing the head suspension assembly 300 from being damaged.

The gimbal tab 311 includes a tongue-like gimbal tongue (not shown) formed at a rear portion thereof. The gimbal tongue protrudes toward the center of the gimbal 303. The head 105 is fixed to the gimbal tongue with a low elasticity epoxy resin. A dimple (not shown) of the load beam 302 provides a single point support for the gimbal tongue. The gimbal 303 is welded to the load beam 302 at a base portion (not shown) on a rear side thereof. A front portion of the gimbal 303, including the gimbal tongue, is not welded, remaining in a free state.

The load beam 302 is formed from a stainless steel-based metal or similar sheet material. The load beam 302 functions as a thin flat spring with precision. The load beam 302 is thin and lightweight and is shaped so as to retain a required rigidity. The load beam 302 includes the tab 116 disposed at the leading end portion thereof. The tab 116 protrudes from the leading end portion of the load beam 302. The tab 116 is integrated with the load beam 302. The tab 116 is bent to extend from the leading end portion of the load beam 302 toward the side of the magnetic disk 101. Forming the tab 116 integrally with the load beam 302 helps suppress an increase in weight of the load beam 302 (and the suspension 110), thereby suppressing degradation in the dynamic characteristics.

Referring to FIG. 3(b), the load beam 302 includes the tab 116 and a head support portion 302a disposed on the side of the pivot axis 107 of the tab 116. The tab 116 is formed to allow the head 105 to be unloaded onto the ramp 115. The head support portion 302a, disposed between the tab 116 and the pivot axis 107, supports the head 105 excluding the tab 116. Specifically, for example, the head support portion 302a extends from the root of the load beam 302 to a portion bent to form the tab 116 (the portion bent toward the side of the magnetic disk 101). The tab 116, on the other hand, extends from the bent portion to the leading end of the load beam 302. In accordance with an embodiment of the present invention, the tab 116 and the head support portion 302a are formed continuously. Accordingly, a head support portion side end (end edge) of the tab 116 and a tab side end (end edge) of the head support portion 302a are continuous at a boundary therebetween.

The tab 116 is formed at the leading end portion of the load beam 302. The center (center axis) of the tab 116 in the pivoting direction (crosswise direction) of the suspension 110 coincides with the center (center axis) of the tab side end of the head support portion 302a. According to an embodiment of the present invention, the load beam 302 has a symmetrical axis that coincides with a symmetrical axis of the tab 116. The load beam 302 and the tab 116 are formed symmetrically about this axis. During loading or unloading, this symmetrical axis serves as a central axis of vibration in the torsional direction.

Figure 10:
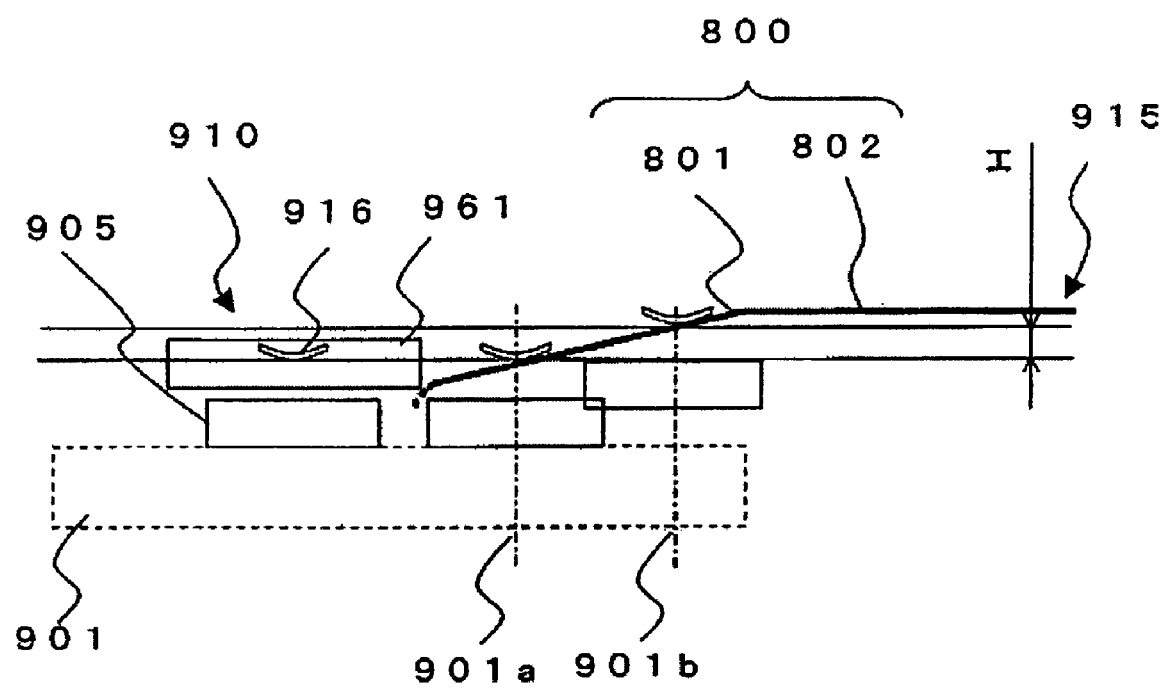
FIG. 10 is an exemplary view showing a state of the conventional suspension during loading or unloading.

The width (dimension in the pivoting direction) of the tab 116 is larger than the width of the conventional tab shown in FIG. 10 and the slider of the head 105. The tab 116 has edges 312, 313, and 314 on the outer periphery thereof. The edges 312 and 314 extend toward the leading end of the tab 116 in the longitudinal direction of the tab 116. Each of these edges 312 and 314 extends obliquely toward the central axis of the tab 116 (load beam 302) from both ends of side portions of the head support portion 302a of the load beam 302.

Specifically, the tab 116 has a trapezoidal shape having a wide width on its root side and a narrow width on its leading end side. The width of the tab 116 on the root side is identically wide to the leading end portion of the head support portion 302a of the load beam 302. The width of the tab 116 on the leading end side is narrower than that on the root side. More specifically, according to an embodiment of the present invention, the width of the tab 116 on its edge adjacent to the head support portion 302a is identical to the width of the head support portion 302a on its edge adjacent to the tab 116. The edge 313 disposed at the leading end of the tab 116 extends in the crosswise direction. Accordingly, the tab 116 has a predetermined width on the leading end thereof. According to an embodiment of the present invention, the tab 116 is extended toward the side of the magnetic disk 101 from the head support portion 302a of the load beam 302. As a result, during loading or unloading, the edge 313 contacts the sliding surface 200 of the ramp 115. The edges 312 and 314, however, do not contact the sliding surface 200.

With respect to the rigidity of the tab 116, and the contact and workability during sliding motion along the ramp 115, the tab 116 is preferably shaped to be flat, having a flanged outer peripheral portion. The tab 116 may, for example, be U-shaped or arcuate.

The load beam 302 includes a flange 321 extending in the longitudinal direction thereof (that is, a direction perpendicular to the pivoting direction of the suspension 110). Specifically, the flange 321 is formed on both edge portions of the load beam 302 in the direction of extending from the tab 116 (front side) toward the arm 111 (rear side). The flange 321 is formed from an end portion on the front side (the side of the tab 116) of a hinge portion 331 toward the leading end portion of the load beam 302. The flange 321 is formed integrally and continuously from each of both edge portions of the load beam 302 to an outer peripheral portion of the tab 116. In some embodiments, the hinge portion 331 does not include a flange. The hinge portion 331 generates summation by producing an elastic force toward the side of the magnetic disk 101 (the side of the gimbal 303). The hinge portion 331 includes an opening 332 formed at a central portion thereof. The opening 332 is formed to reduce the weight of the load beam 302.

The flange 321 may be formed by bending the edge portion of the load beam 302 through pressworking toward the backside surface on which the head 105 is secured. The flange 321 contributes to an increased rigidity of the load beam 302. Particularly, in the embodiment of the present invention, the flange 321 is formed over a range on the leading end side from an end face of the head 105 on the side of the tab 116, that is, from a position at which the front end portion of the head 105 is disposed to the leading end of the tab 116. The flange of the tab 116 extends up to both ends in the pivoting direction of the head support portion 302a. As such, the flange 321 on the edge portion of the head support portion 302a is integrally and continuously formed with the outer peripheral portion of the tab 116. This arrangement enhances rigidity of the load beam 302 including the tab 116. As a result, degradation of the dynamic characteristics and rigidity of the suspension 110 may be effectively suppressed.

With respect to the rigidity, the flange 321 is preferably made as long as possible. In the embodiment of the present invention, therefore, the flange 321 is formed to cover up to the end portion on the tab side of the hinge portion 331. The tab 116 may include a flange only on the leading end portion thereof. This enhances the rigidity of the tab 116. Furthermore, the tab 116 according to an embodiment of the present invention slides over the ramp while the leading end of the tab 116 is in contact with the ramp. The flange disposed on the leading end portion of the tab 116 contributes to a smooth sliding motion on the ramp. Focusing on the tab 116, it is preferable that the flange be formed on an outer edge of the tab 116, covering from the leading end of the tab 116 all the way to the end on the side of the head support portion 302a.

The tab 116 includes a plurality of openings 322. These openings 322 suppress an increase in weight of the tab 116 even if the tab 116 has a wide width. Forming the plurality of openings 322 spaced apart from each other helps suppress reduction in rigidity of the tab 116. In addition, the load beam 302 includes a plurality of openings 323. These openings 323 help enhance machinability of the load beam 302 and make assembly of the suspension 110 efficient. Further, the openings 323 suppress an increase in weight. The openings 323 are separated in a mesh form, which enhances the rigidity of the load beam 302.

Figure 5:
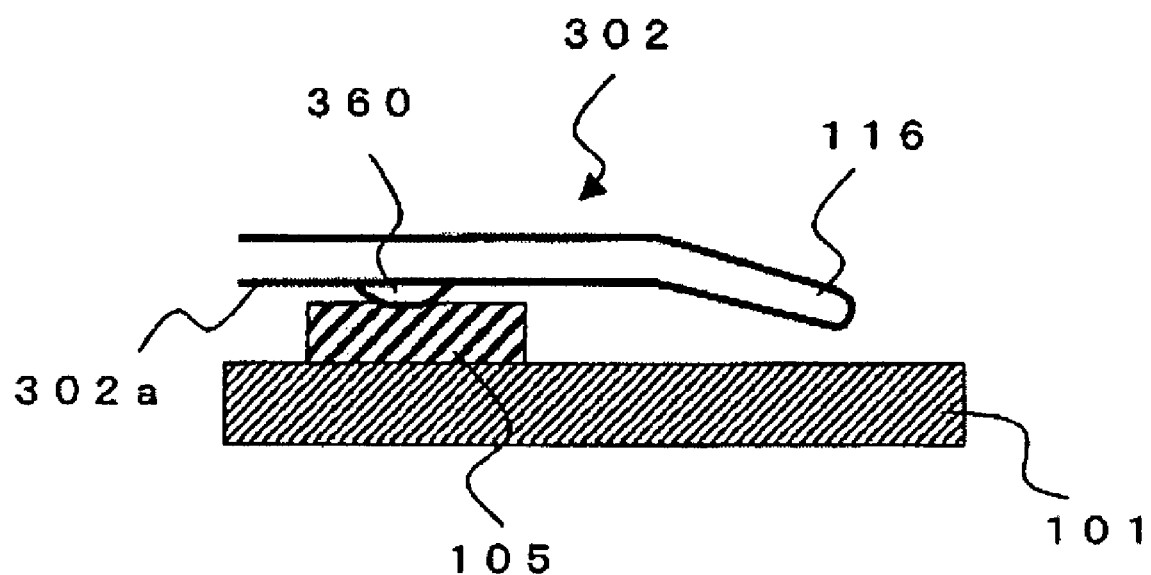
FIG. 5 is an exemplary side elevational view showing an arrangement of a suspension according to an embodiment of the present invention.

FIG. 5 is a side elevational view showing the load beam 302 disposed at the leading end portion of the suspension 110. FIG. 5 shows a state of the load beam 302 in which the head 105 is located above the magnetic disk 101. The FPC 301 and the gimbal 303 are omitted from FIG. 5.

Referring to FIG. 5, a dimple 360 disposed on the load beam 302 provides a single point support for the head 105. The head 105 may thereby fly at a predetermined height above the surface of the magnetic disk 101. As described earlier, the tab 116 is bent to extend toward the side of the magnetic disk 101 from the leading end portion of the head support portion 302a of the load beam 302. Specifically, the tab 116 has the leading end lower in height than the head support portion 302a over the magnetic disk 101. The tab 116 is formed to be gradually lower in height toward the leading end. The tab 116 is particularly extended in the direction different from the direction in which the head support portion 302a extends. Specifically, the head support portion 302a extends in parallel with the magnetic disk 101, while the tab 116 is inclined obliquely relative to the magnetic disk 101 and the head support portion 302a.

In an embodiment of the present invention, the tab 116 is bent once at the leading end portion of the head support portion 302a. The small number of bent portions means the small number of bending processes, which enhances ease of manufacturing the load beam 302. On the other hand, the tab 116 may be formed by bending once at the leading end portion of the head support portion 302a in the direction away from the magnetic disk 101. The load beam 302 may still be easily manufactured even in this arrangement. It is to be noted, however, that the tab 116 may be formed through bending of the tab 116 a plurality of times as long as ease of manufacturing is ensured.

Figure 6:
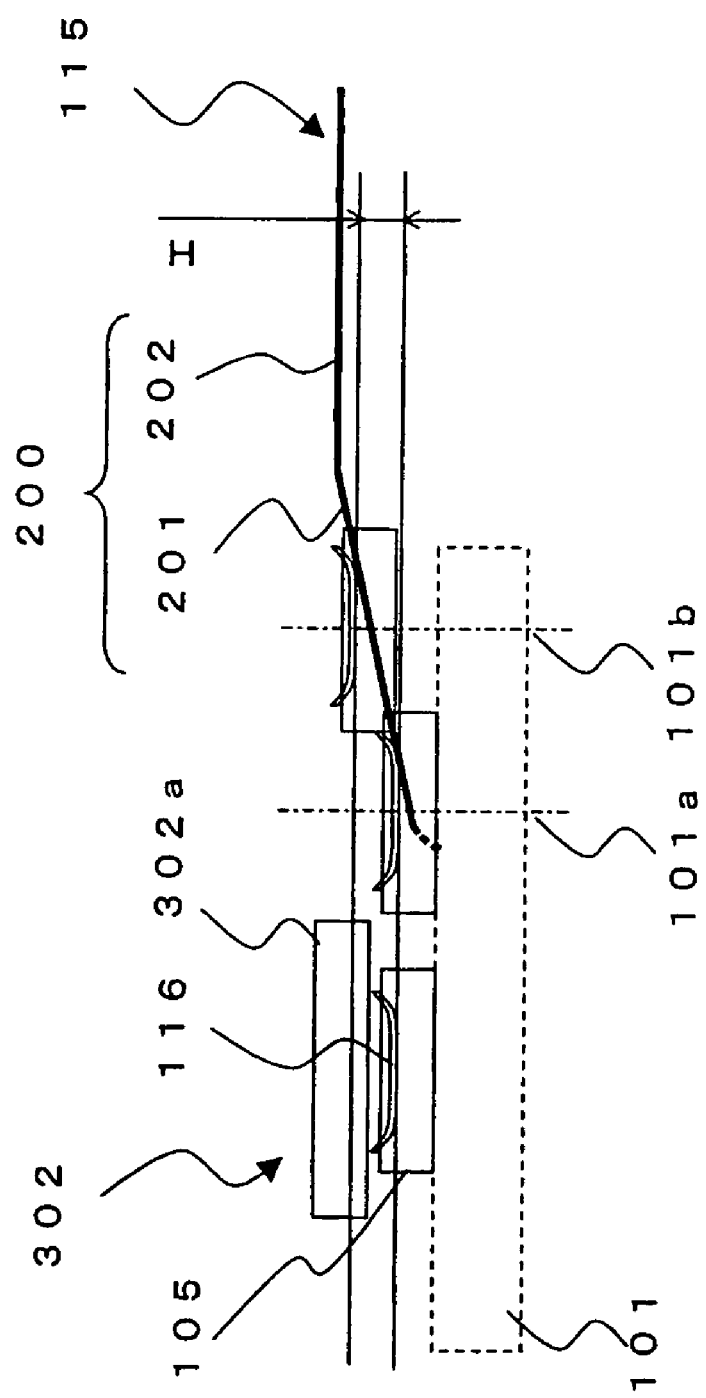
FIG. 6 is an exemplary view showing a state, during loading or unloading, of the suspension according to an embodiment of the present invention.
Figure 7:
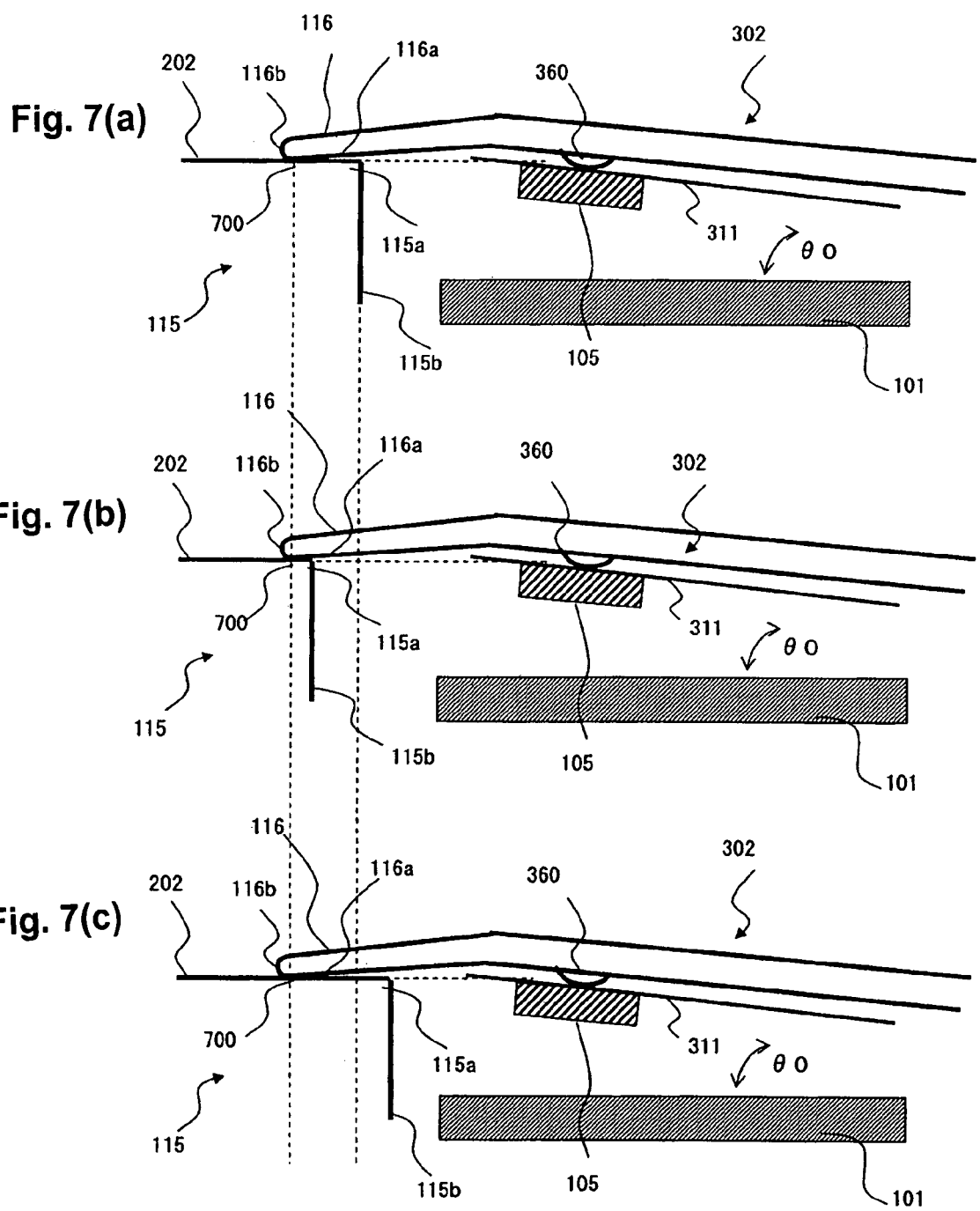
FIGS. 7(a) to 7(c) are exemplary views showing a state of the tab and a head according to an embodiment of the present invention.

FIG. 6 is a view showing a state during loading or unloading as viewed from the leading end side of the load beam 302. FIGS. 7(a) to 7(c) are views showing the load beam 302 as viewed from a side when the tab 116 rests on the maximum lift surface 202. Similar drawings are obtained even when the ramp 115 rests on any one of the other faces of the ramp 115. As described earlier, the tab 116 slides along the ramp 115 while being in contact with the magnetic disk side inclined face 201 of the ramp 115 during unloading, thereby lifts the load beam 302 to a predetermined height to allow the head 105 to be separated from the magnetic disk 101, and ascends up to the maximum lift surface 202.

In FIG. 6, reference numeral 101a represents a position at which the tab 116 makes the first contact with the magnetic disk side inclined face 201. Reference numeral 101b represents a position at which the tab 116 is required to be lifted up to separate the head 105 from the magnetic disk 101. Further, a height H represents a distance required to separate the head 105 from the magnetic disk 101.

Referring to FIGS. 7(a) to 7(c), during loading or unloading, the sliding surface 200 of the ramp 115 contacts a leading end portion 116b of the tab 116 and an abdominal surface 116a of the tab 116 is away from the sliding surface 200 and a corner 115a of the sliding surface 200 on the side of the tab 116. Similarly to in FIGS. 11(a) to 11(c), the position and size of the ramp 115 vary according to mechanical errors. Here, only errors in a ramp assembly position (in a direction toward a rotary shaft of the suspension) are considered without considering errors in a height direction of the ramp.

FIG. 7(a) is a view showing a state in which there is no error in the assembly position of the ramp 115. FIG. 7(b) is a view showing a state in which a side surface 115b of the ramp 115 on the side of the load beam 302 is far away from the load beam 302 compared with in FIG. 7(a). FIG. 7(c) is a view showing a state in which the side surface 115b of the ramp 115 on the side of the load beam 302 is close to the load beam 302 compared with in FIG. 7(a).

In accordance with an embodiment of the present invention, the leading end of the tab 116 is disposed more on the side of the magnetic disk 101 than the head support portion 302a of the load beam 302. As a result, when the tab 116 slides over the ramp 115, the leading end of the tab 116 is positioned lower in height than the root side or the central portion (abdominal surface 116a) of the tab 116. Specifically, the distance from the magnetic disk 101 is the smallest. Consequently, in any one of FIGS. 7(a) to 7(c), only the sliding surface 200 of the ramp 115 and the leading end portion 116b of the tab 116 contact with each other at a point of contact 700. The leading end portion 116b only contacts the sliding surface 200 of the ramp 115. The other portions of the tab 116 including the abdominal surface 116a of other than the leading end portion 116b are away from the sliding surface 200. With this arrangement, even if the position of the side surface 115b of the ramp 115 is changed due to an assembly error in the ramp 115, the point of contact 700 does not move at a predetermined position.

In the conventional arrangements, due to the error in the assembly position, the point of contact between the tab and the ramp moves in the range from the position at which the ramp is closest to the position at which the ramp is farthest. This makes it necessary to make the length of the tab long enough to allow the tab to contact the ramp at any position of the ramp in accordance with the moving point of contact. According to an embodiment of the present invention, the position of the point of contact 700 remains unchanged. This eliminates the need for setting the length of the tab 116 in consideration of the error in the assembly position of the ramp 115 as in the conventional arrangements. As a result, the length of the tab 116 may be set short.

An inclination q0 of the load beam 302 relative to the magnetic disk 101 when the load beam 302 is lifted remains unchanged in any one of the states of FIGS. 7(a) to 7(c), since the point of contact 700 is not moved by the error in the assembly position of the ramp 115. Consequently, since the position (101a shown in FIG. 6) at which the head 105 is separated from the magnetic disk 101 during unloading remains unchanged even when the error in the assembly position of the ramp 115 occurs, there is no change the recording area of the magnetic disk 101. This eliminates the need for narrowing the recording area in consideration of the error in the assembly position as in the conventional arrangements. As a result, the recording area may be increased.

With the conventional arrangements, it is necessary to make the ramp high if the recording area is to be secured. In an embodiment of the present invention, however, even when the error in the assembly position of the ramp 115 occurs, there is no change in the inclination q0 and thus the lifting distance of the load beam 302 is not changed. It is therefore not necessary to make the ramp 115 high in consideration of the error in the assembly position of the ramp 115.

The tab 116 is inclined relative to the head support portion 302a more than the inclination q0 of the head support portion 302a relative to the magnetic disk 101 during loading or unloading. As shown in FIGS. 7(a) to 7(c), when the tab 116 is in contact with the ramp 115, the height from the point of contact between the tab 116 and the ramp 115 to the recording surface of the magnetic disk 101 is lower than the height from the portion of the head support portion 302a farthest from the recording surface of the magnetic disk 101 to the recording surface. As a result, only the leading end portion 116b of the tab 116 contacts the sliding surface 200.

The tab 116 according to an embodiment of the present invention is bent toward the side of the magnetic disk 101. As shown in FIGS. 7(a) to 7(c), when the tab 116 is on the maximum lift surface 202, the maximum lift surface 202 intersects with a surface of the gimbal 303 on the side of the magnetic disk 101. With the flexing tab 116, the rigidity of the tab 116 may be improved.

Further, referring to FIG. 6, the tab 116 is extended from the leading end portion of the load beam 302 with a predetermined width so that the tab 116 has a flat cross section in the pivoting direction. Accordingly, the magnetic disk side inclined face 201 of the ramp 115 contacts a side portion (the edge 312) at the leading end of the tab 116 during unloading. Specifically, the ramp 115 contacts a portion away from the center of the pivotal motion of the tab 116 toward the ramp 115, not the center of the pivotal motion of the tab 116 (the center of the load beam 302). This allows the head 105 to be located more on the side of the center of the magnetic disk 101 when the tab 116 contacts the ramp 115. In addition, the point of contact 101a between the tab 116 and the ramp 115 may then be located more on the outside of the magnetic disk 101. In one embodiment of the present invention, the tab 116 preferably has a dimension (width) in the pivotal direction thereof greater than the width of the head 105 (slider). The tab 116 thereby contacts the magnetic disk side inclined face 201 of the ramp 115 at a position more outside than the head 105 in the pivotal direction during unloading or loading. As a result, the tab 116 may be made shorter to improve the rigidity.

The edge 312 at the leading end of the tab 116 may be made even longer such that the head 105 is disposed even more on the side of the center of the magnetic disk 101 when the tab 116 and the ramp 115 contact with each other. This arrangement, however, leads to the increased weight of the tab 116 and degraded impact resistance. In an embodiment of the present invention, therefore, the length of the edge 312 is made shorter than the width of the head support portion 302a of the load beam 302, so that the tab 116 is formed into a trapezoid thereby to suppress an increase in weight and improve impact resistance.

According to an embodiment of the present invention, the leading end portion of the tab 116 is made to be lower in height than the head support portion 302a so that the leading end portion of the tab 116 may be in contact with the sliding surface 200 of the ramp 115. If it is prioritized to provide the arrangement in which the point of contact 101a between the tab 116 and the ramp 115 during unloading be positioned outside the magnetic disk 101, the head support portion 302a and the leading end portion of the tab 116 may be identical in height.

Figure 8:
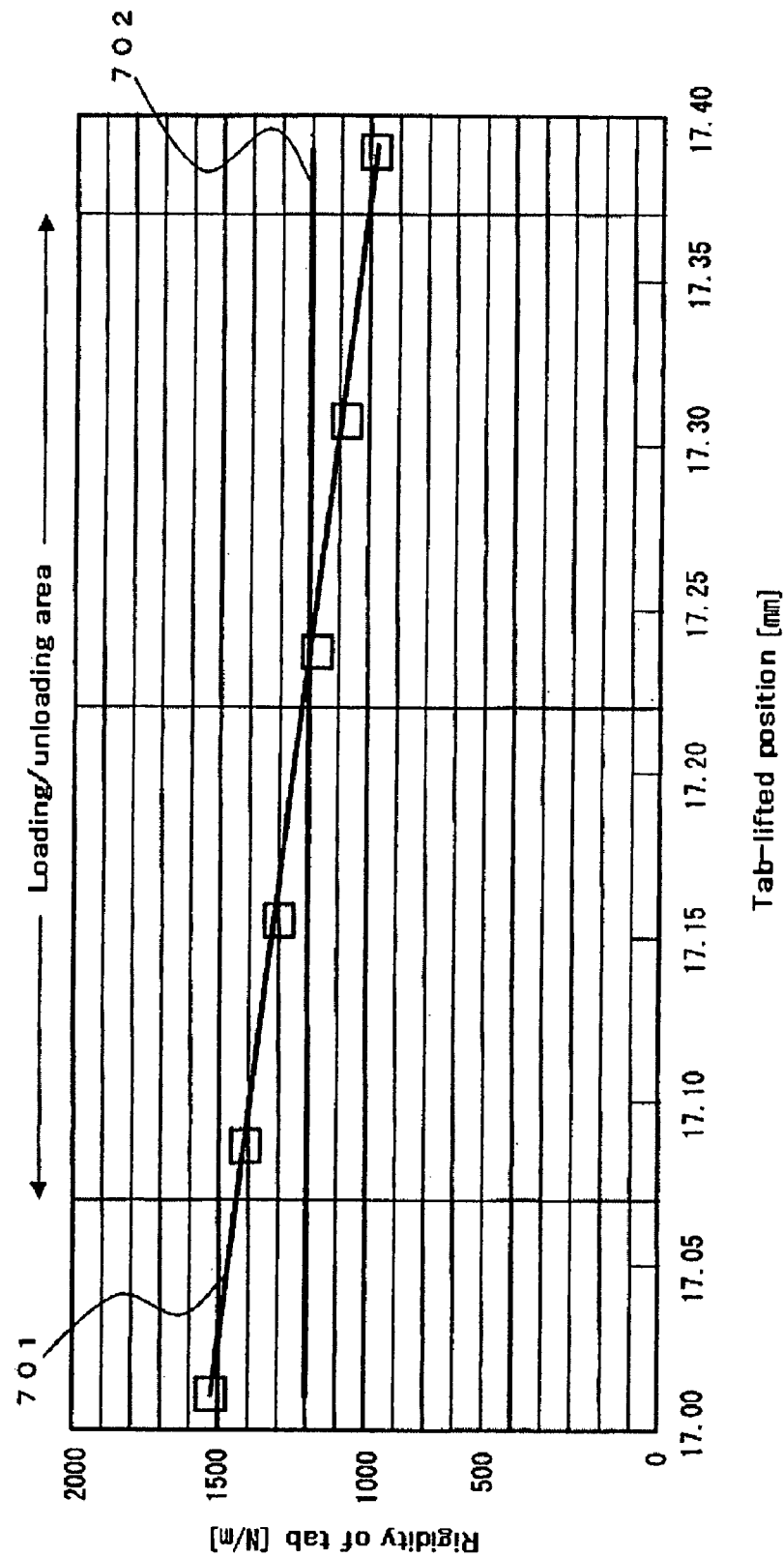
FIG. 8 is an exemplary diagram showing rigidity characteristics of the tab according to an embodiment of the present invention.
Figure 9:
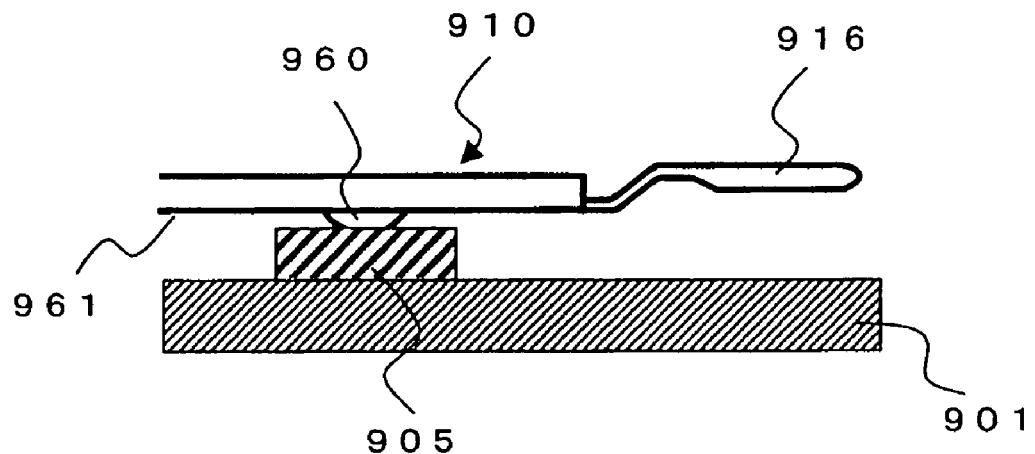
FIG. 9 is an exemplary side elevational view showing an arrangement of a conventional suspension.

FIG. 8 is a diagram showing rigidity characteristics of the tab relative to tab-lifted positions. In FIG. 8, characteristics 701 represent rigidity characteristics of the conventional tab as shown in FIGS. 9, 10, and 11(a) to 11(c). Characteristics 702, on the other hand, represent rigidity characteristics of the tab 116 according to the embodiment of the present invention. In FIG. 8, "tab lifted position" refers to the position of the contact between the tab and ramp in the longitudinal direction of the tab during loading or unloading.

As shown by the characteristics 701, the tab-lifted position is varied due to the error in the assembly position of the ramp with the conventional tab. As a result, the rigidity of the tab varies depending on the tab-lifted position. If the tab-lifted position is small (the tab being close to the head), the bending of the tab is small and thus the rigidity of the tab is high. If the tab-lifted position is large (the tab being far from the head), the bending of the tab is large and thus the rigidity of the tab is small. With the conventional tab, therefore, it is necessary to consider the assembly position of the ramp for the rigidity of the tab.

As shown by the characteristics 702, the tab-lifted position is not varied due to the error in the assembly position of the ramp with the tab 116 according to an embodiment of the present invention. As a result, the rigidity of the tab remains always constant. Accordingly, variation in the rigidity of the tab may be suppressed.

As described above, in accordance with an embodiment of the present invention, the tab 116 is bent toward the side of the magnetic disk 101, and during loading or unloading, the tab 116 contacts the sliding surface of the ramp 115, not the corner of the ramp 115. As a result, the point of contact between the ramp 115 and the tab 116 does not change, which eliminates the need for considering the error in the assembly position of the ramp 115. Consequently, the length of the tab 116 may be made shorter, so that the recording area of the magnetic disk 101 may be increased. In addition, the height of the ramp 115 may be made lower so that the HDD 100 may be made thinner. Moreover, variation in the rigidity of the tab may be suppressed.

In the foregoing arrangement, the tab is bent once toward the side of the magnetic disk. The number of bend portions is not, however, limited to one and the tab may be bent a plurality of times. The tab may be shaped in other ways as long as the leading end portion of the tab contacts the sliding surface of the ramp and any portions other than the leading end portion do not contact the ramp.

Embodiments in accordance with the present invention may be applied to various types of storage devices that optically process storage data, in addition to the HDD. Embodiments in accordance with the present invention may also be applied to a data storage device including a head for reading or writing data.

While the present invention has been described with reference to specific embodiments, those skilled in the art will appreciate that different embodiments may also be used. Thus, although the present invention has been described with respect to specific embodiments, it will be appreciated that the present invention is intended to cover all modifications and equivalents within the scope of the following claims.

What is claimed is:

1. A data storage device comprising:
   a head that accesses a recording area of a medium;
   a ramp that has a retracted position where the head is unloaded from a surface of the medium; and
   an actuator that pivots around a pivot axis to unload the head onto the retracted position and load the head from the retracted position onto the surface of the medium;
   wherein the actuator has a load beam that includes a head support portion for supporting the head and a tab disposed on the side opposite to the pivot axis relative to the head support portion and with a leading end in contact with the ramp;
   wherein the tab comprises portions, other than the leading end, that are disposed away from the leading end and are away from the ramp when the tab is in contact with the ramp.

2. The data storage device according to claim 1,
   wherein portions of the tab excluding the leading end are away from the ramp when the tab is in contact with the ramp.

3. The data storage device according to claim 1,
   wherein the tab extends more toward the medium than the head support portion when the tab is located at a position above the surface of the medium.

4. The data storage device according to claim 3,
   wherein, when the tab is in contact with the ramp, a height from the surface of the medium to a point of contact between the tab and the ramp is lower than a height from the surface of the medium to a portion of the head support portion farthest from the surface of the medium.

5. The data storage device according to claim 1,
   wherein the center of the tab in the direction of the pivotal motion coincides with the center of an end of the head support portion on the side adjacent to the tab; and
   wherein a leading end away from the center of the tab in the direction of the pivotal motion contacts an inclined surface of the ramp.

6. The data storage device according to claim 5,
   wherein the width of a portion of the tab near the head support portion is the same as the width of the head support portion; and
   wherein the width of the leading end of the tab is smaller than that of the portion of the tab near the head support portion.

7. The data storage device according to claim 5,
   wherein both ends of the tab in the direction of the pivotal motion are extended from both ends of the head support portion on the side adjacent to the tab.

8. The data storage device according to claim 5,
wherein the tab includes a flange formed by bending a leading end portion of the tab.

9. The data storage device according to claim 5,
wherein the load beam includes flanges formed by bending both end edges of the load beam in the direction of the pivotal motion.

10. The data storage device according to claim 9,
wherein the flanges are formed continuously from the leading end of the tab up to the both ends of the head support portion in the direction of the pivotal motion.

11. The data storage device according to claim 1,
wherein the tab is formed by bending once from the head support portion.

12. A disk drive comprising:
a head that accesses a recording area of a disk;
a ramp that includes a retracted position onto which the head is unloaded from a surface of the disk; and
an actuator that pivots around a pivot axis to unload the head onto the retracted position and load the head from the retracted position onto the surface of the disk;
wherein the actuator has a gimbal and a load beam;
the gimbal supports the head on a surface of the gimbal on the side of the disk;
the load beam includes a gimbal support portion for supporting the gimbal on a surface of the load beam on the side of the disk, and a tab disposed on the side opposite to the pivot axis relative to the gimbal support portion and sliding over the ramp; and
wherein, when the tab is located on the highest surface of the ramp during unloading, the surface of the gimbal on the side of the disk intersects with the surface of the ramp;
wherein the tab comprises a leading end and portions other than the leading end, where the portions other than the leading end are disposed away from the leading end and are away from the ramp when the tab is in contact with the ramp.

13. The disk drive according to claim 12,
wherein the leading end of the tab contacts the surface of the ramp.

14. The disk drive according to claim 12,
wherein the tab is bent toward the side of the disk.

\* \* \* \* \*